US009691097B2

(12) United States Patent  
Lifson

(10) Patent No.: US 9,691,097 B2  
(45) Date of Patent: Jun. 27, 2017

(54) SYSTEM AND METHOD OF PROVIDING RECOMMENDATIONS

(71) Applicant: Amazon Technologies, Inc., Reno, NV (US)

(72) Inventor: David M. Lifson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 460 days.

(21) Appl. No.: 14/285,945

(22) Filed: May 23, 2014

(65) Prior Publication Data  
US 2014/0258026 A1 Sep. 11, 2014

Related U.S. Application Data

(63) Continuation of application No. 13/620,633, filed on Sep. 14, 2012, now Pat. No. 8,738,468, which is a continuation of application No. 13/169,841, filed on Jun. 27, 2011, now Pat. No. 8,271,352, which is a continuation of application No. 11/854,506, filed on Sep. 12, 2007, now Pat. No. 7,970,665.

(51) Int. Cl.  
G06Q 30/00 (2012.01)  
G06Q 30/06 (2012.01)  
G06Q 10/10 (2012.01)  
G06Q 30/02 (2012.01)  
G06Q 50/00 (2012.01)  
H04M 7/00 (2006.01)

(52) U.S. Cl.  
CPC ......... G06Q 30/0631 (2013.01); G06Q 10/10 (2013.01); G06Q 30/02 (2013.01); G06Q 30/0601 (2013.01); G06Q 30/0641 (2013.01); G06Q 50/01 (2013.01); H04M 7/0024 (2013.01); H04M 2203/655 (2013.01)

(58) Field of Classification Search  
CPC .......... G06Q 30/0601–30/0643; G06Q 30/08; G06Q 50/01  
See application file for complete search history.

(56) References Cited

U.S. PATENT DOCUMENTS

| 4,996,642 | A | 2/1991 | Hey |
| 6,041,311 | A | 3/2000 | Chislenko et al. |
| 6,963,850 | B1 | 11/2005 | Bezos et al. |
| 7,240,055 | B2 | 7/2007 | Grasso et al. |

(Continued)

OTHER PUBLICATIONS

Referral Web: Combining Social Networks and Collaborative Filtering, Communications of the ACM. Mar. 1997, vol. 40, No. 3, pp. 63-65.

(Continued)

Primary Examiner — Willian Allen  
(74) Attorney, Agent, or Firm — Knobbe, Martens, Olson & Bear LLP

(57) ABSTRACT

A method of providing recommendations is disclosed and includes receiving a selection of an offering via an online site. The method also includes outputting a detail page related to the offering via the online site. The detail page includes a first selectable indicator corresponding to a social network of a visitor and a second selectable indicator corresponding to unfiltered content. The method also includes outputting at least one recommendation via the detail page. Each recommendation is associated with a member of the social network when input received via the online site indicates a selection of the first selectable indicator.

20 Claims, 7 Drawing Sheets

(56) References Cited

U.S. PATENT DOCUMENTS

| | | |
|---|---|---|
| 7,254,552 B2 | 8/2007 | Bezos et al. |
| 7,409,362 B2 | 8/2008 | Calabria |
| 7,519,562 B1 | 4/2009 | Vander Mey et al. |
| 7,630,986 B1 | 12/2009 | Herz et al. |
| 7,657,458 B2 | 2/2010 | Calabria |
| 7,689,452 B2 | 3/2010 | Lam et al. |
| 7,698,165 B1 | 4/2010 | Tawakol et al. |
| 7,739,153 B1 | 6/2010 | Anderson et al. |
| 7,747,630 B2 | 6/2010 | Scofield et al. |
| 7,752,081 B2 | 7/2010 | Calabria |
| 7,752,082 B2 | 7/2010 | Calabria |
| 7,756,753 B1 | 7/2010 | McFarland |
| 7,756,756 B1 | 7/2010 | Lifson |
| 7,761,342 B2 | 7/2010 | Calabria |
| 7,761,343 B2 | 7/2010 | Calabria |
| 7,778,926 B1 | 8/2010 | Grinchenko et al. |
| 7,822,646 B2 | 10/2010 | Calabria |
| 7,827,055 B1 | 11/2010 | Snodgrass et al. |
| 7,881,975 B2 | 2/2011 | Calabria |
| 7,949,573 B1 | 5/2011 | Cohen et al. |
| 7,970,665 B1 | 6/2011 | Lifson |
| 8,060,463 B1 | 11/2011 | Spiegel |
| 8,091,032 B2 | 1/2012 | Fischer |
| 8,095,432 B1 | 1/2012 | Berman et al. |
| 8,260,787 B2 | 9/2012 | Lam et al. |
| 8,285,840 B2 | 10/2012 | Dobroth et al. |
| 2001/0037255 A1 | 11/2001 | Tambay et al. |
| 2003/0093329 A1 | 5/2003 | Gutta |
| 2003/0093793 A1 | 5/2003 | Gutta |
| 2003/0167222 A1 | 9/2003 | Mehrotra et al. |
| 2003/0172004 A1 | 9/2003 | Anderson |
| 2003/0220802 A1 | 11/2003 | Cossey et al. |
| 2004/0059626 A1 | 3/2004 | Smallwood |
| 2004/0230511 A1 | 11/2004 | Kannan et al. |
| 2005/0033656 A1 | 2/2005 | Wang et al. |
| 2005/0171955 A1 | 8/2005 | Hull et al. |
| 2005/0177385 A1 | 8/2005 | Hull et al. |
| 2005/0178132 A1 | 8/2005 | Hull et al. |
| 2005/0203807 A1 | 9/2005 | Bezos et al. |
| 2005/0261989 A1 | 11/2005 | Vadron et al. |
| 2005/0273378 A1 | 12/2005 | MacDonald-Korth et al. |
| 2006/0026033 A1 | 2/2006 | Brydon et al. |
| 2006/0085259 A1 | 4/2006 | Nicholas et al. |
| 2006/0200432 A1 | 9/2006 | Flinn et al. |
| 2006/0218153 A1 | 9/2006 | Voon et al. |
| 2006/0218225 A1 | 9/2006 | Hee Voon et al. |
| 2007/0064626 A1 | 3/2007 | Evans |
| 2007/0179863 A1 | 8/2007 | Stoll |
| 2008/0033739 A1 | 2/2008 | Zuckerberg et al. |
| 2008/0189274 A1 | 8/2008 | Mann |
| 2008/0189768 A1 | 8/2008 | Callahan et al. |
| 2008/0235111 A1 | 9/2008 | Dotan et al. |
| 2008/0243628 A1 | 10/2008 | Wiseman et al. |
| 2008/0255933 A1 | 10/2008 | Leventhal et al. |
| 2008/0255934 A1 | 10/2008 | Leventhal et al. |
| 2009/0319288 A1 | 12/2009 | Slaney et al. |
| 2011/0093336 A1 | 4/2011 | Calabria |
| 2011/0258073 A1 | 10/2011 | Lifson |
| 2012/0158539 A1 | 6/2012 | Lawrence et al. |

OTHER PUBLICATIONS

Next-Generation Flavor in Integrated Online Catalogs., Library Technology Reports, Jul./Aug. 2007, vol. 43, Issue 4, Chicago.

SYSTEM AND METHOD OF PROVIDING RECOMMENDATIONS

CROSS-REFERENCES TO RELATED APPLICATIONS

This application is a continuation of U.S. patent application Ser. No. 13/620,633, entitled SYSTEM AND METHOD OF PROVIDING RECOMMENDATIONS USING SOCIAL NETWORKS, and filed Sep. 14, 2012; which is a continuation of U.S. patent application Ser. No. 13/169,841, entitled SYSTEM AND METHOD OF PROVIDING RECOMMENDATIONS, and filed Jun. 27, 2011, now U.S. Pat. No. 8,271,352; which is a continuation of U.S. patent application Ser. No. 11/854,506, entitled METHOD, SYSTEM, AND COMPUTER READABLE MEDIUM FOR OUTPUTTING OFFER RECOMMENDATIONS FROM MEMBERS OF A SOCIAL NETWORK, and filed Sep. 12, 2007, now U.S. Pat. No. 7,970,665, the entireties of which are incorporated herein by reference.

BACKGROUND OF THE INVENTION

The present disclosure is generally related to providing recommendations related to offerings available for purchase via an online site.

Products, services, subscriptions, and other offerings are available via online sites. Online sites can provide recommendations of similar or related products based on what other customers have purchased or viewed. Nonetheless, these generic recommendations may not be effective to persuade a visitor to the online site to make a purchase. For example, the use of generic recommendations can often produce lists of recommendations that are too long to be useful to the visitor. Hence, there is a need for an improved system and method of providing recommendations.

DETAILED DESCRIPTION OF THE PREFERRED EMBODIMENT

A system to provide recommendations is disclosed and includes a server system having processing logic and memory accessible to the processing logic. The memory includes instructions executable by the processing logic to provide an online site and receive input indicating a selection of an offering via the online site. The memory also includes instructions executable by the processing logic to output a detail page via the online site. The detail page including a first selectable indicator corresponding to content filtered by a social network and a second selectable indicator corresponding to unfiltered content. Further, the memory includes instructions executable by the processing logic to output at least one recommendation via the detail page. Each recommendation is associated with a member of a social network when input is received indicating a selection of the first selectable indicator.

In another particular embodiment, a method of providing recommendations is disclosed and includes receiving a selection of an offering via an online site. The method also includes outputting a detail page related to the offering via the online site. The detail page includes a first selectable indicator corresponding to a social network of a visitor and a second selectable indicator corresponding to unfiltered content. The method also includes outputting at least one recommendation via the detail page. Each recommendation is associated with a member of the social network when input received via the online site indicates a selection of the first selectable indicator.

In another particular embodiment, a computer-readable medium is disclosed having processor-readable instructions that are executable by processing logic to perform a method. The method comprises providing an online site to a visitor and receiving input indicating a selection of an offering via the online site; outputting a detail page via the online site, the detail page including a plurality of selectable indicators corresponding to a plurality of recommendation filtering options; and outputting at least one recommendation via the detail page, where the at least one recommendation is associated with one of the plurality of recommendation filtering options.

Figure 1:
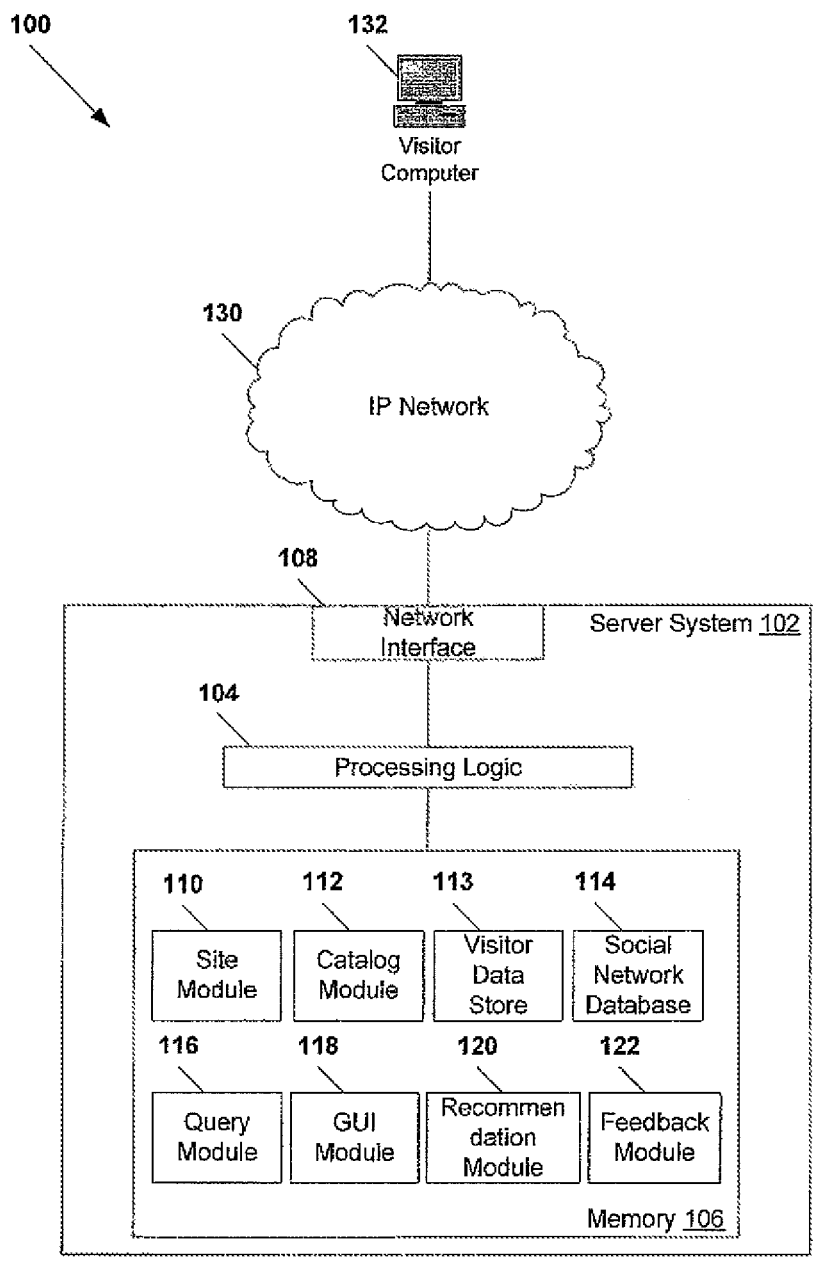
FIG. 1 is a block diagram of a particular embodiment of a system to provide recommendations.

Referring to FIG. 1, a particular embodiment of a system to provide recommendations is illustrated and designated generally 100. The system 100 includes a server system 102 that is adapted to provide an online site offering goods, services, subscriptions, other offerings, or any combination thereof, for purchase via an Internet Protocol (IP) network 130, such as the Internet. The IP network 130 can be accessible to various computers, such as a visitor computer 132, other devices, such as a web-enabled mobile communication device, or any combination thereof.

In one embodiment, the server system 102 includes a single computer server, such as a web server. Alternatively, the server system 102 includes multiple servers that independently or redundantly include logic and memory adapted to provide one or more functions with respect to fulfilling electronic commerce-based transactions. The server system 102 includes processing logic 104, such as one or more processors, and memory 106 that is accessible to the processing logic 104. The server system 102 also includes at least one network interface 108 to facilitate communication between the server system 102 and the IP network 130.

The memory 106 can include various modules 110-122 that are adapted to provide various functions of the server system 102 with respect to providing recommendations. The modules 110-122 can include processor-readable instructions that are executable by the processing logic 104, such as instructions included in one or more applications, operating systems, or other computer programs. In other embodiments, the modules 110-122 can include any combination of instructions and hardware logic.

For example, the memory 106 includes a site module 110 that is executable by the processing logic 104 to provide an online site via the IP network 130. The online site offers an electronic catalog of products, services, subscriptions, other offerings, or any combination thereof, to customers or other visitors. The memory 106 includes a catalog module 112 to store data related to the products, services, subscriptions, other offerings, or any combination thereof, that are offered via the online site. In one embodiment, the site module 110 is executable by the processing logic 104 to provide a search process via the online site, which allows visitors to search the data stored by the catalog module 112 and which returns one or more search results in response to a search request.

The memory also includes a visitor data store 113 to store data indicating offerings purchased, viewed, recommended, reviewed, or any combination thereof, by customers and other visitors to the online site. The data can be stored in association with each visitor, in one or more aggregations, or any combination thereof.

The memory includes a social network database 114 to store social network information associated with various customers or other visitors that are registered with the online site. For example, when a visitor registers with the online site, the website module 110 is executable by the processing logic 104 to prompt the visitor for contact information associated with one or more members of a social network that is to be associated with the visitor. Such contact information can include names or other identifications, e-mail addresses, telephone numbers, mobile phone numbers, IP addresses, other contact information, or any combination thereof. The website module 110 is executable by the processing logic 104 to receive contact information that is entered via the visitor computer 132. Further, the website module 110 is executable by the processing logic 104 to import the contact information from a contact list at the visitor computer 132, from an address book or other contact list at a customer phone, from an online social networking site or other additional site provided by the IP network 130, or any combination thereof. The social network database 114 can store one or more social networks associated with a visitor. In an illustrative embodiment, members of social networks can overlap.

The memory 106 include a query module 116 that is executable by the processing logic 104 to query the social network database 114 to identify one or more social networks associated with a visitor, in response to a selection of a product or offering via the online site. In addition, the memory 106 includes a graphical user interface (GUI) module 116 that is executable by the processing logic 104 to provide various graphical user interfaces including interactive graphical elements via the online site. For example, the GUI module 116 can be executable by the processing logic 104 to provide a detail page, such as a product-detail page, via the online site in response to a selection of a product from search results or another page of the online site. The GUI module 116 is executable by the processing logic 104 to include with the detail page a plurality of selectable indicators corresponding to various recommendation filters.

Figure 4:
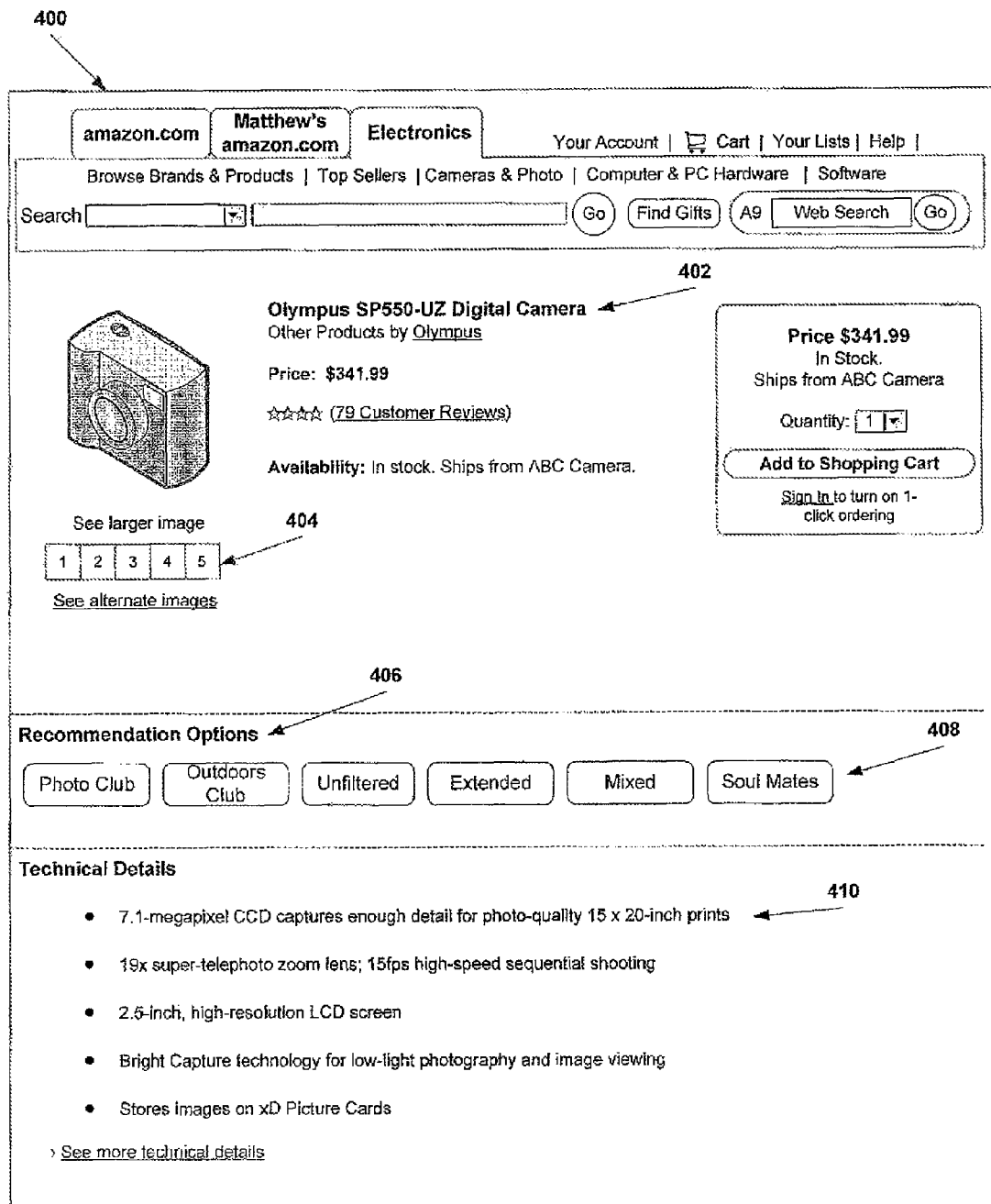
FIG. 4 is a diagram of a particular embodiment of a graphical user interface to provide recommendations.
Figure 5:
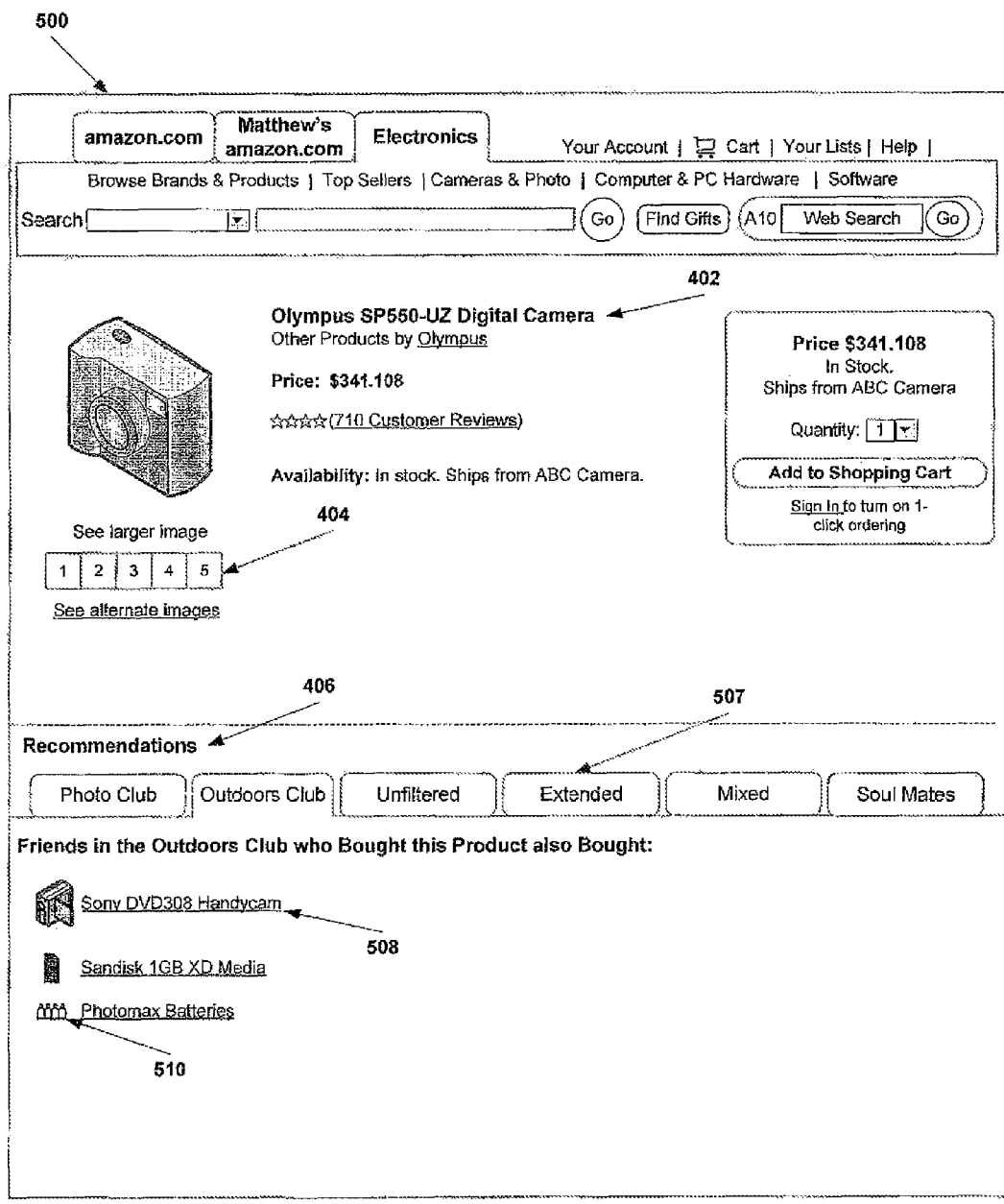
FIG. 5 is a diagram of a second particular embodiment of a graphical user interface to provide recommendations.
Figure 6:
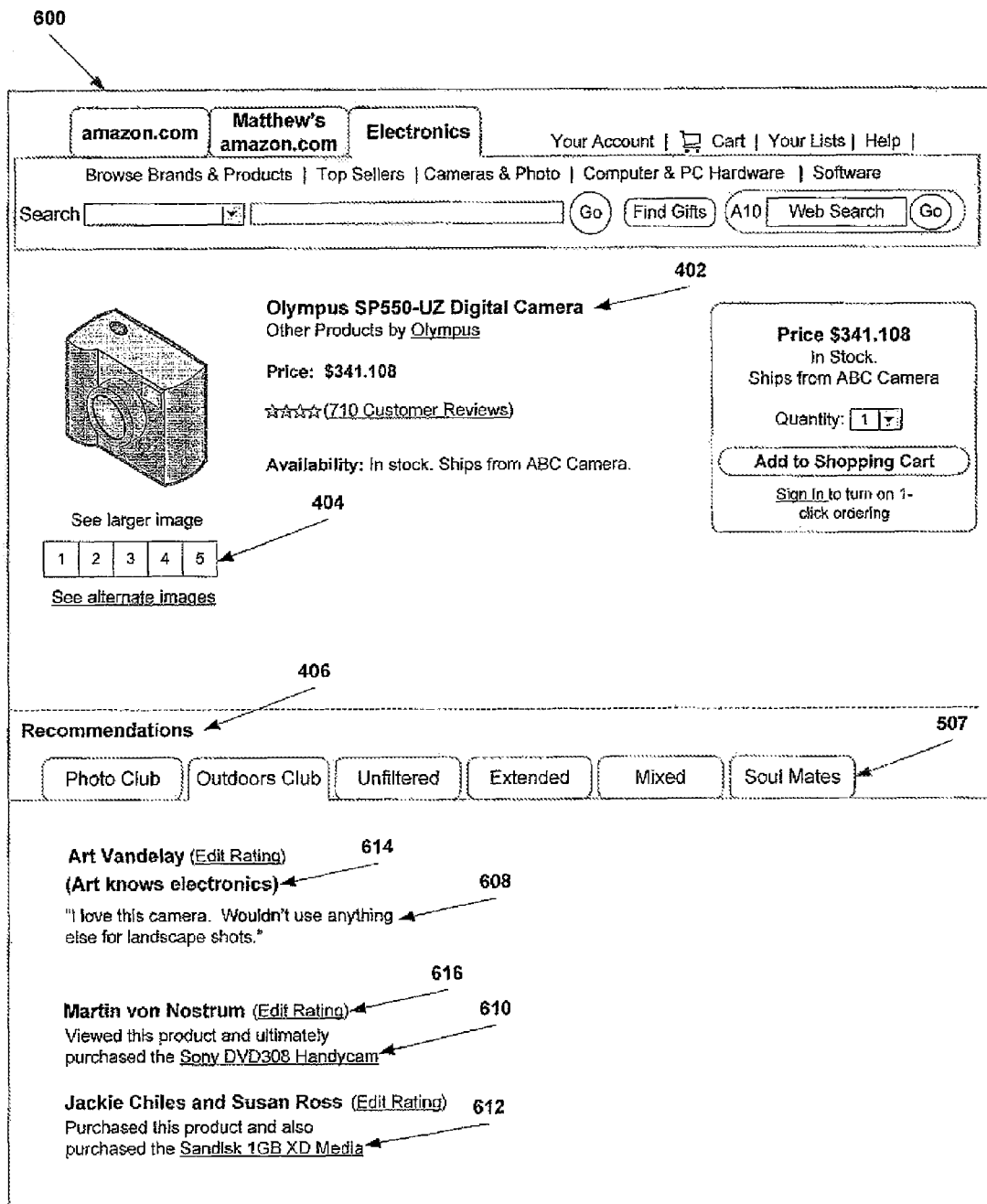
FIG. 6 is a diagram of a third particular embodiment of a graphical user interface to provide recommendations.

For instance, at least one selectable indicator corresponds to recommendations based on one or more social networks associated with the visitor, as identified via the query module 116. Another selectable indicator corresponds to unfiltered recommendations that do not exclude registered users of the online site that are outside the social network(s) associated with the visitor. Yet another selectable indicator corresponds to mixed results that include recommendations based on one or more social networks and unfiltered recommendations. Still another selectable indicator corresponds to extended recommendations that include members of other social networks, where the other social networks are associated with members of the visitor's social network(s). Another selectable indicator corresponds to profile-based recommendations, such as recommendations based on behavior of customers or other visitors that share purchasing history, viewing history, demographic data, or any combination thereof, with the visitor. Examples of such detail pages are illustrated in FIGS. 4-6.

The memory 106 includes a recommendation module 120 that is executable by the processing logic 104 to generate recommendations related to a product or other offering selected by a visitor and to output the recommendations via a detail page. The recommendation module 120 is executable by the processing logic 104 to determine the recommendations based on offerings that are viewed, purchased, recommended, reviewed, or any combination thereof, by other visitors registered with the online site, by one or more members of a social network associated with the visitor, or according to other filters selected by the visitor.

For instance, recommendations can include one or more indications that a member of a social network of the visitor purchased the offering; one or more indications that a member of the social network of the visitor viewed the offering; reviews of the offering from members of the social network that purchased the offering; one or more similar offerings viewed or purchased by a member of the social network; one or more related offerings viewed or purchased by a member of the social network; or any combination thereof.

In another example, recommendations can include similar offerings purchased by visitors outside the social network who viewed the offering selected by the visitor; similar offerings viewed by such other visitors; related offerings purchased by such other visitors (e.g., memory purchased by customers that purchased a digital camera); related offerings viewed by such other visitors; or any combination thereof. In another embodiment, the recommendations can be output as aggregates, such as products purchased by members of a certain social network who also purchased the offering viewed by the visitor. Examples of recommendations are illustrated in FIGS. 5-6.

In a particular embodiment, the memory 106 includes a feedback module 122 that is executable by the processing logic 104 to receive ratings from a visitor associated with the social network that includes the members whose recommendation is output via the online site. For example, the ratings can indicate a level of trust associated with a member in general, with respect to a product category (e.g., Art is trusted highly regarding electronics), with respect to other factors, or any combination thereof. Ratings can be stored in association with member data at the social network database 114 and can be output with future responsive data received from the member and output to the visitor that designated the trust level or other rating.

Figure 2:
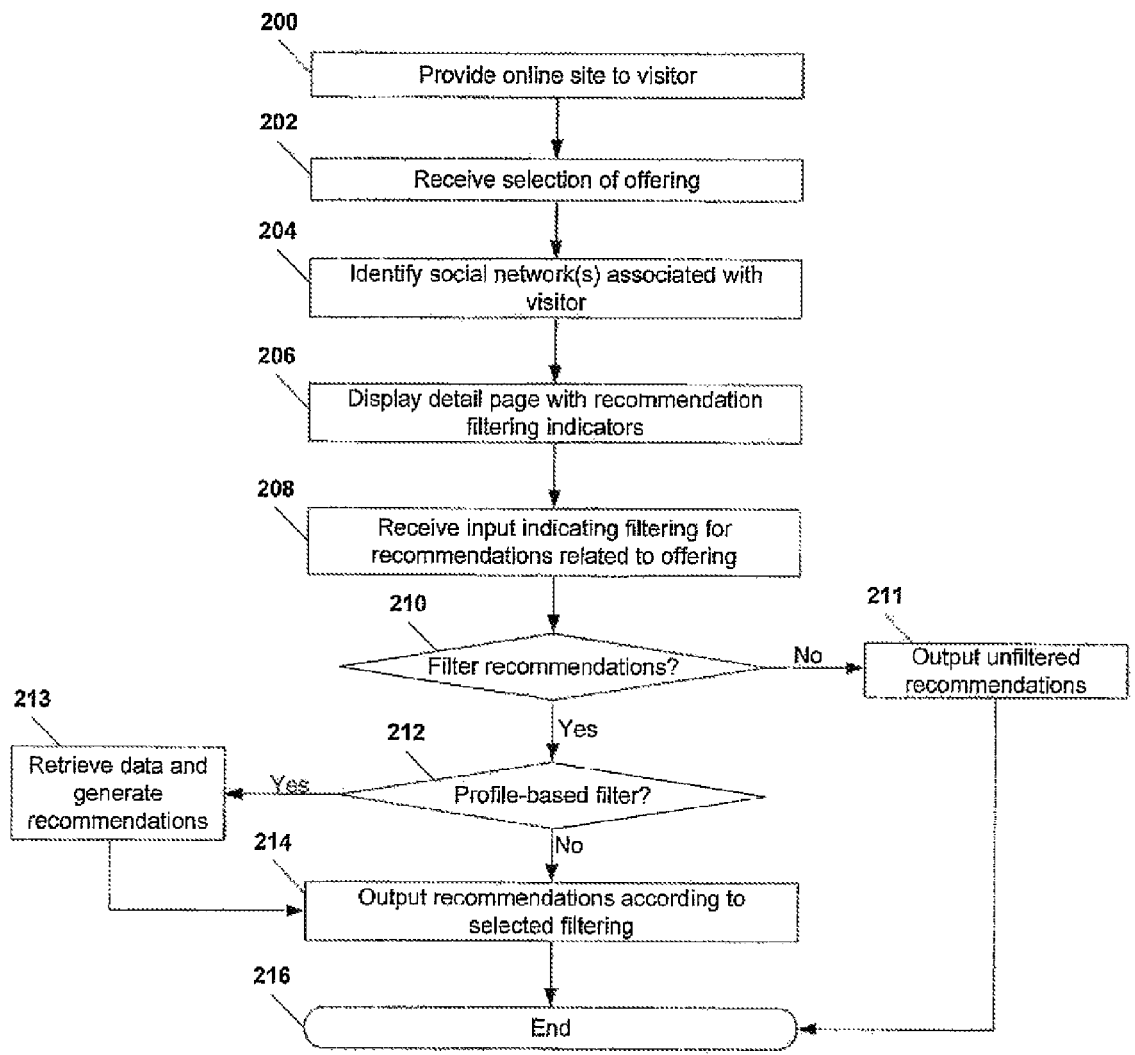
FIG. 2 is a flow diagram of a particular embodiment of a method of providing recommendations.

Referring to FIG. 2, a flow diagram of a particular embodiment of a method of providing recommendations is illustrated. At block 200, a server system provides an online site to a visitor, such as a customer, via a computing device, mobile phone, or other device. The online site provides a catalog of goods, services, subscriptions, other offerings, or any combination thereof, for purchase. Moving to block 202, the server system receives a selection of an offering from the customer via the online site. Proceeding to block 204, the server system identifies at least one social network associated with the visitor.

Continuing to block 206, the server system displays a detail page related to the offering via the online site. The detail page includes a plurality of selectable recommendation filtering indicators. The indicators correspond to at least one social network of the visitor, to unfiltered recommendations, to extended recommendations, to mixed recommendations, or any combination thereof. Examples of such indicators are illustrated in FIGS. 4-5. Advancing to block 208, the server system receives input indicating a selection of one of the recommendation filtering indicators.

At decision 210, the server system determines whether the selection indicates that recommendations are to be filtered. If the recommendations are not to be filtered, the method moves to block 211, and the server system outputs unfiltered recommendations to the visitor via the detail page or another graphical user interface of the online site. The method then terminates at 216.

Whereas, if recommendations are to be filtered, the method proceeds to decision node 212, and the server system determines whether the selected filter is a profile-based filter. If the selected filter is not a profile-based filter, the method advances to 214. Conversely, if the selected filter is a profile-based filter, the method moves to block 213, and the server system retrieves data related to other visitors who share profile attributes with the visitor, such as purchasing history, viewing history, demographic data, or any combination thereof. Further, the server system generates recommendations based on the retrieved data. At block 214, the server system outputs filtered recommendations corresponding to the selected filtering indicator. The method terminates at 216.

Figure 3:
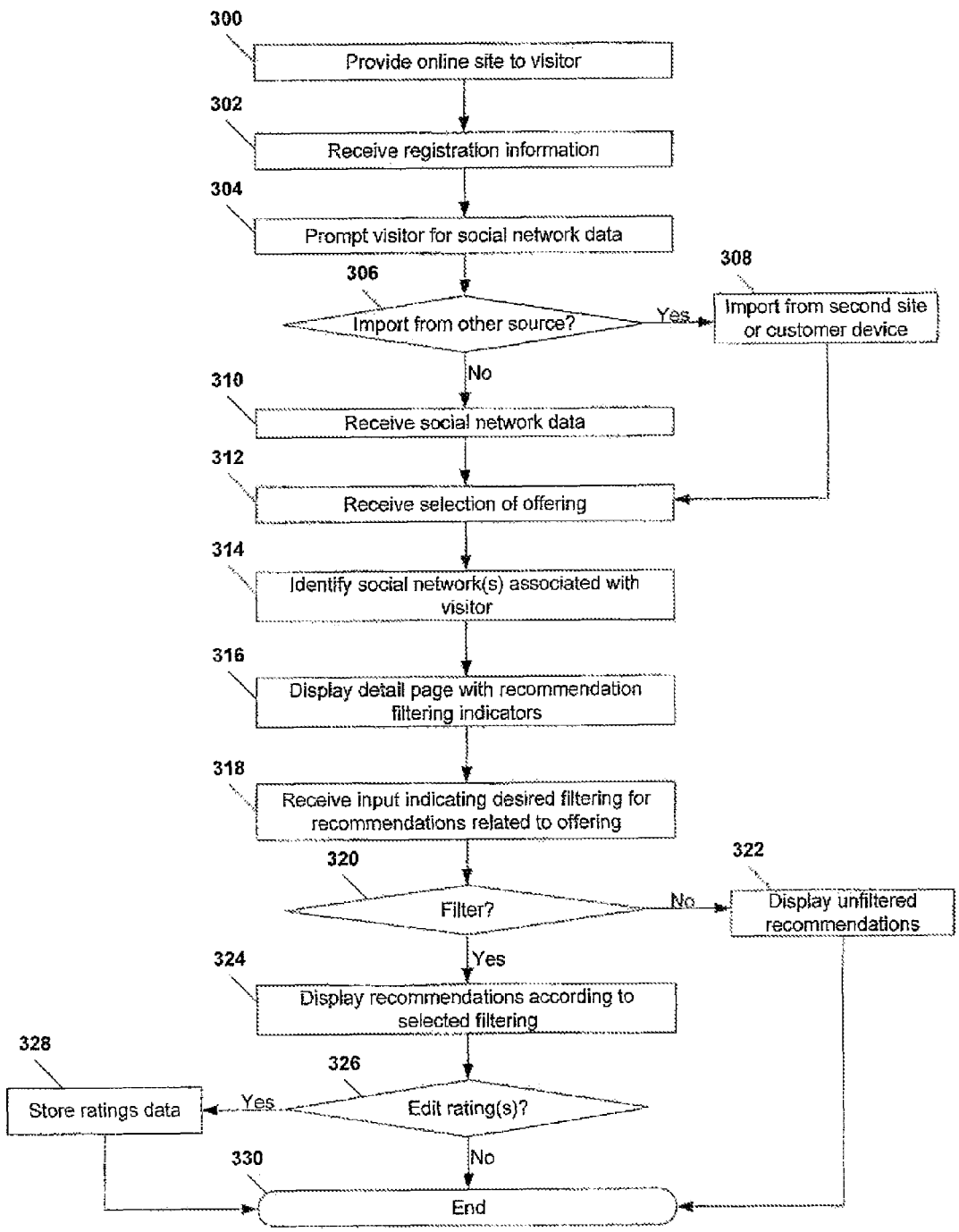
FIG. 3 is a flow diagram of a second particular embodiment of a method of providing recommendations.

Referring to FIG. 3, a flow diagram of a second particular embodiment of a method of providing recommendations is illustrated. At block 300, a server system provides an online site to a visitor. The online site provides a catalog of goods, services, subscriptions, other offerings, or any combination thereof, for purchase. Moving to block 302, the server system receives registration information from the visitor, such as a name, contact information, credit information, other information to establish an account, or any combination thereof. Proceeding to block 304, the server system prompts the visitor for data related to one or more social networks that are to be associated with the visitor. For instance, the server system prompts the visitor for contact information of one or more members that are to be associated with the social network(s).

Continuing to decision 306, the server system determines whether it has received a command to import social network data from another source, such as a computing device or mobile phone of the visitor, or from another online site, such as a social networking site. If the server system has received a command to import social network data from another source, the method advances to block 308, and the server system imports the social network data from another source, such as another online site or a visitor device. The method then moves to block 312. Conversely, if the server system does not receive a command to import social network data from another source, the method advances to block 310, and the server system receives the social network from the visitor via a social network setup process provided via the online site. The method then moves to block 312.

Moving to block 312, the server system receives a selection of an offering, such as a product, from the visitor via the online site. Proceeding to block 314, the server system identifies at least one social network associated with the visitor. Continuing to block 316, the server system displays a detail page related to the offering, such as a product detail page, via the online site. The detail page includes a plurality of selectable recommendation filtering indicators. The indicators correspond to at least one social network of the visitor, to unfiltered recommendations, to extended recommendations, to mixed recommendations, or any combination thereof. Examples of such indicators are illustrated in FIGS. 5-6. Advancing to block 318, the server system receives input indicating a selection of one of the recommendation filtering indicators.

At decision 320, the server system determines whether the selection indicates that recommendations are to be filtered. If the recommendations are not to be filtered, the method moves to block 322, and the server system outputs unfiltered recommendations to the visitor via the detail page or another graphical user interface of the online site. Whereas, if recommendations are to be filtered, the method proceeds to block 324, and the server system outputs filtered recommendations corresponding to the selected filtering indicator.

Continuing to block 326, the server system determines whether to edit rating information associated with one or more members whose responsive data has been output via the product detail page. For instance, the server system can determine whether it has received a request from the visitor to designate ratings. Alternatively, the server system can determine whether it has received input from the visitor indicating whether responsive data from a particular member was helpful or not helpful, whereupon the server system can automatically adjust a rating associated with the particular member. If the server system determines to edit rating information, the method advances to block 328, and the ratings data is received and stored. The method terminates at 330.

In some embodiments, the methods disclosed herein may be performed as described. In other embodiments, certain aspects of the methods may be performed in alternate sequences or simultaneously. In addition, registration, social network setup, selection of an offering, or any combination thereof, may occur in a single session or in different sessions with the online site. Further, while the methods are largely described with reference to products, the methods may be applied to products, services, subscriptions, other online offerings, or any combination thereof.

Referring to FIG. 4, a diagram of a particular embodiment of a graphical user interface (GUI) to provide recommendations is illustrated. The GUI 400 includes a detail page related to a product 402. The detail page includes, for example, one or more images 404 associated with the product 402 and technical details or specifications 410 related to the product 402. In a particular embodiment, the GUI 400 includes a recommendation options region 406 that displays a plurality of selectable indicators 408 corresponding to recommendation filtering options. The plurality of selectable indicators can correspond to at least one social network of the visitor (e.g., photo club and outdoors club), to unfiltered recommendations, to extended recommendations, to mixed recommendations, to profile-based recommendations based on visitors sharing common behaviors or demographic data with the visitor (e.g., "soul mates" tab), or any combination thereof.

Referring to FIG. 5, a diagram of a second particular embodiment of a graphical user interface (GUI) to provide recommendations is illustrated. The GUI 500 includes a detail page related to a product 402. The detail page includes, for example, one or more images 404 associated with the product 402. In a particular embodiment, the GUI 500 includes a recommendation options region 406 that displays a plurality of selectable indicators, such as tabs 507, corresponding to the recommendation filtering option indicators shown at 408 in FIG. 4. The plurality of selectable tabs can correspond to at least one social network of the visitor (e.g., photo club and outdoors club), to unfiltered recommendations, to extended recommendations, to mixed recommendations, to profile-based recommendations, or any combination thereof.

Further, the GUI 500 includes recommendations corresponding to a selected indicator, such as the indicator corresponding to the outdoors club. Recommendations can include one or more indications that, in aggregate, members of the selected social network who purchased the offering 402 also purchased one or more other offerings 508. For example, the recommendations can indicate that members of an outdoors club who purchased a digital camera also purchased batteries, memory media, video equipment, or any combination thereof. In an illustrative embodiment, the recommendations can include an image 510 of each recommended offering.

Referring to FIG. 6, a diagram of a second particular embodiment of a graphical user interface (GUI) to provide recommendations is illustrated. The GUI 600 includes a detail page related to a product 402. The detail page includes, for example, one or more images 404 associated with the product 402. In a particular embodiment, the GUI 600 includes a recommendation options region 406 that displays a plurality of selectable indicators, such as tabs 507 corresponding to the recommendation filtering option indicators shown at 408 in FIG. 4. The plurality of selectable tabs can correspond to at least one social network of the visitor (e.g., photo club and outdoors club), to unfiltered recommendations, to extended recommendations, to mixed recommendations, or any combination thereof.

Further, the GUI 600 includes recommendations 608-612 corresponding to a selected indicator, such as the indicator corresponding to the outdoors club. Recommendations can include one or more indications that a party associated with the selected filtering option (e.g., a member of a selected social network) purchased the offering; one or more reviews 608 by customers associated with the selected filtering option who purchased the product 402; one or more indications of similar products 610 purchased by customers associated with the selected filtering option who viewed the product 402; one or more related products purchased by customers associated with the selected filtering option who purchased the product 402; or any combination thereof. When the filtering option is a social network of the visitor, one or more members of the social network can be associated with a trust level 614 or other rating previously designated by the visitor. In an illustrative embodiment, a selectable indicator 616 of an option to edit a rating can be displayed in conjunction with each member identification.

Figure 7:
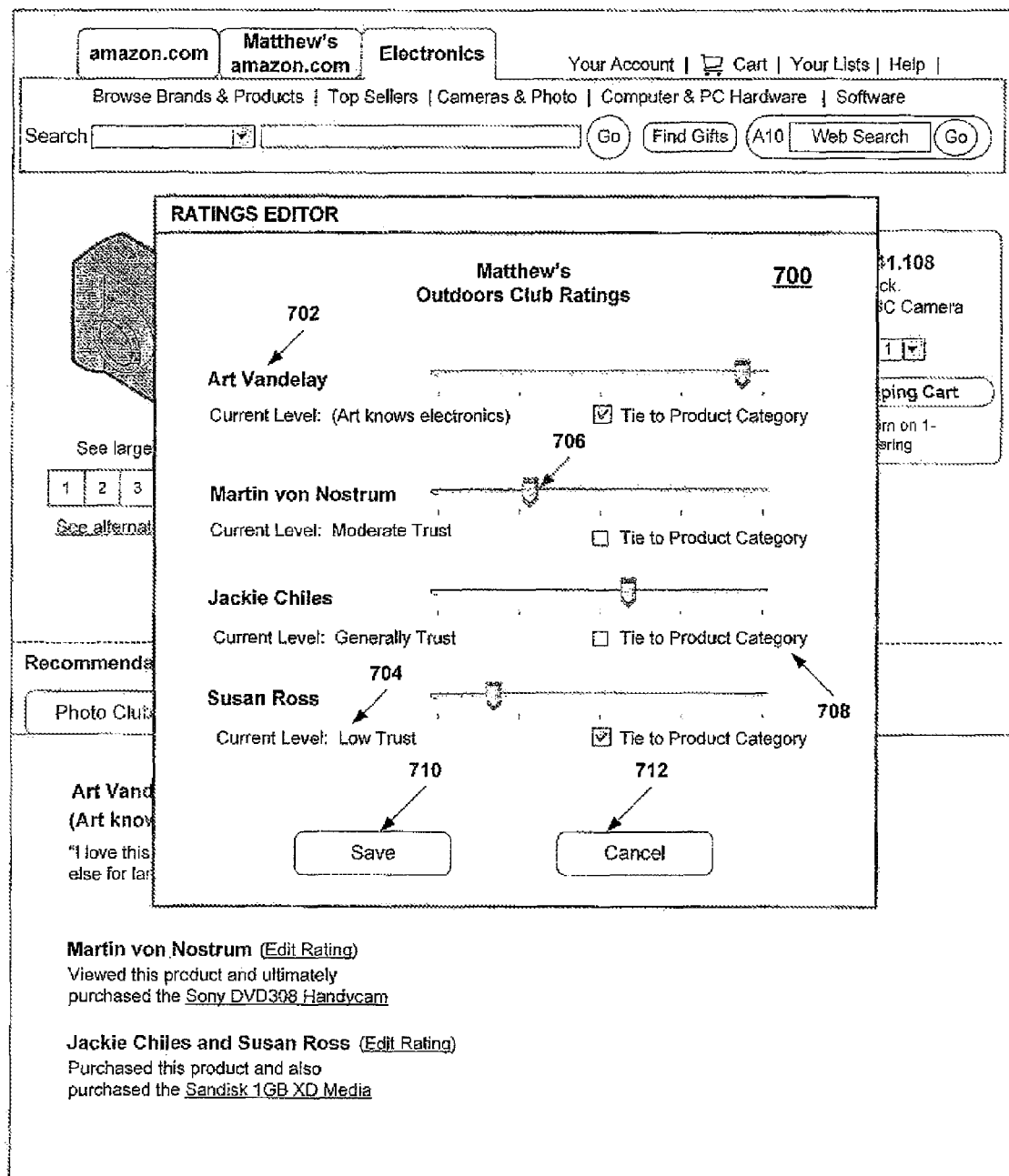
FIG. 7 is a diagram of a particular embodiment of a graphical user interface to adjust ratings.

Referring to FIG. 7, a diagram of a particular embodiment of a graphical user interface (GUI) to adjust ratings is illustrated. In the embodiment illustrated in FIG. 7, the GUI 700 takes the form of a pop-up window overlaying a product detail page. In other embodiments, the GUI 700 can take the form of a separate page of an online site or a sidebar provided by the online site. The GUI 700 includes identifications 702 of at least one member associated with a social network of a visitor to the online site. The GUI 700 also includes a current rating, such as a current trust level associated with each member. Further, the GUI 700 includes a graphical tool, such as a slider bar 706, which is adjustable to edit a rating associated with each member of the social network. As shown, a rating can include, for instance, complete trust, moderate trust, general trust, low trust, no trust, or any combination thereof. In addition, the GUI 700 includes a selectable indicator 708 of an option to tie the trust rating to a product category associated with the product detail page. In an illustrative embodiment, the GUI 700 includes an indicator 710 of an option to save rating levels and an indicator 712 of an option to cancel the rating edit process and exit the GUI 700.

In conjunction with the configuration of structure described herein, a system and method of providing recommendations is provided that allows a visitor to an online site to select filtered, unfiltered, or mixed recommendations related to an offering that is available for purchase via the online site. Allowing the visitor to select filtered recommendations based on a social network of the visitor can reduce the number of recommendations output to the visitor and increase the value of each recommendation to the visitor.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing recommendations, the method comprising:
by a server system, the server system including processing logic and memory accessible to the processing logic, the memory including instructions executable by the processing logic and configured to provide an online site,
providing an user interface for an online site in response to a request from a visitor associated with a visitor computing device, the user interface including one or more offerings;
receiving, by the online site, a selection of an offering of the one or more offerings;
in response to the selection of the offering,
querying a social network data store to identify at least one social network for which the visitor is registered; and
outputting a detail page related to the offering on the online site, the detail page including one or more selectable recommendation indicators corresponding to at least one social network for which the visitor is registered and one or more selectable recommendation indicators corresponding to unfiltered content;
receiving by the online site, a selection of a selectable recommendation indicator;
in response to the selection of the selectable recommendation indicator,
generating at least one recommendation based at least in part on the selectable recommendation indicator; and
causing the display of the at least one recommendation on the detail page.

2. The method of claim 1 further comprising:
determining whether a response to selection of a recommendation indicator corresponds to the social network for which a visitor is determined to be registered; and
in response, causing the display of at least one recommendation comprises an indication that at least one member of the social network purchased the offering, viewed the offering, reviewed the offering, purchased a related offering, viewed a related offering, purchased a similar offering, viewed a similar offering, or any combination thereof.

3. The method of claim 1 further comprising:
determining whether a response to selection of a recommendation indicator corresponds to unfiltered content; and
in response, causing the display of at least one recommendation comprises an indication that at least one visitor determined to be outside the social network purchased the offering, viewed the offering, reviewed the offering, purchased a related offering, viewed a related offering, purchased a similar offering, viewed a similar offering, or any combination thereof.

4. The method of claim 3, wherein the at least one visitor is associated with a trust level corresponding to a determination of helpfulness of recommendations from the at least one visitor.

5. The method of claim 4, wherein the trust level is associated with a product category of offering.

6. The method of claim 4 further comprising:
receiving input from the at least one visitor regarding a determined helpfulness of a previous recommendation associated with the at least one visitor; and
updating the trust level associated with the at least one visitor based on the input.

7. The method of claim 1 further comprising:
determining whether a response to selection of the selectable recommendation indicator corresponds to a social network for which the visitor is determined to be registered; and
in response, including in the detail page related to the offering at least one selectable recommendation indicator corresponding to filtering of the at least one recommendation.

8. A system to provide recommendation, the system comprising:
a server system including processing logic and memory accessible to the processing logic, wherein the memory includes instructions executable by the processing logic to:
provide an user interface for an online site in response to a request from a visitor associated with a visitor computing device, the user interface including one or more offerings;
receive, by the online site, a selection of an offering of the one or more offerings;
in response to the selection of the offering,
querying a social network data store to identify at least one social network for which the visitor is registered; and
output a detail page related to the offering on the online site, the detail page including one or more selectable recommendation indicators corresponding to at least one social network for which the visitor is determined to be registered and one or more selectable recommendation indicators corresponding to unfiltered content, wherein the at least one social network comprises a set of members;
receive, by the online site, a selection of a selectable recommendation indicator; and
in response to the selection of the selectable recommendation indicator,
generate at least one recommendation based at least in part on the selectable recommendation indicator; and
cause the display of at least one recommendation on the detail page.

9. The system of claim 8, wherein the at least one recommendation indicates that at least one member of the set of members has purchased the offering, viewed the offering, reviewed the offering, purchased a related offering, viewed a related offering, purchased a similar offering, viewed a similar offering, or any combination thereof.

10. The system of claim 8, wherein the at least one recommendation includes at least one aggregated recommendation based on aggregated data associated with a plurality of members in the set of members.

11. The system of claim 8, wherein each of the members in the set of members is associated with a trust level.

12. The system of claim 11, wherein the trust level comprises one of: complete trust, general trust, moderate trust, low trust or no trust.

13. The system of claim 11, wherein the detail page further includes an option to edit the trust level associated with each of the members.

14. A non-transitory computer-readable storage medium having processor-readable instructions that are executable by processing logic to perform a method, the method comprising:
   providing an user interface for an online site in response to a request from a visitor associated with a visitor computing device, the user interface including one or more offerings;
   receiving, by the online site, a selection of an offering of the one or more offerings;
   in response to the selection of the offering,
      querying a social network data store to identify at least one social network for which the visitor is registered; and
      outputting a detail page related to the offering via the online site, the detail page including a set of selectable recommendation indicators, one or more selectable recommendation indicators corresponding to at least one social network for which a visitor is registered and one or more selectable recommendation indicators corresponding to unfiltered content;
   obtaining a selection of one of the set of selectable recommendation indicators; and
   in response to the selection of the selectable recommendation indicator,
      generating at least one recommendation based at least in part on the selectable recommendation indicator; and
      causing the display of the at least one recommendation on the detail page related to the offering.

15. The non-transitory computer-readable storage medium of claim 14, in the method further comprising:
   determining whether a response to the selection of one of the set of selectable recommendation indicators corresponds to unfiltered content; and
   in response, causing the display of an indication that at least one visitor outside the social network purchased the offering, viewed the offering, reviewed the offering, purchased a related offering, viewed a related offering, purchased a similar offering, viewed a similar offering, or any combination thereof.

16. The non-transitory computer-readable storage medium of claim 14, in the method further comprising:
   determining whether a selection of the selectable recommendation indicators corresponds to a social network for which the visitor is registered; and
   in response, including in the detail page related to the offering at least one selectable recommendation indicator corresponding to filtering of the at least one recommendation.

17. The non-transitory computer-readable storage medium of claim 16, wherein filtering of the at least one recommendation comprises filtering based on profiles associated with the social network.

18. The non-transitory computer-readable storage medium of claim 16, wherein the at least one social network for which a visitor is registered comprises a set of members.

19. The non-transitory computer-readable storage medium of claim 18, wherein the at least one recommendation includes at least one aggregated recommendation based on aggregated data associated with a plurality of members in the set of members.

20. The non-transitory computer-readable storage medium of claim 18, wherein the detail page further includes an option to edit a trust level associated with each of the members in the set of members.

* * * * *